2,298,709

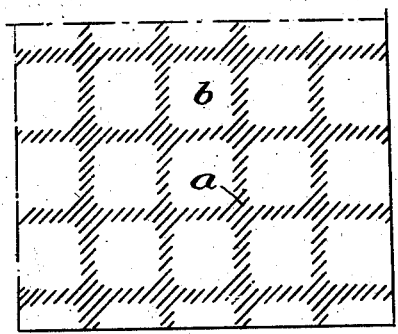
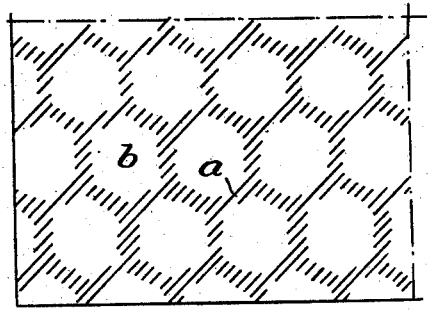
Fig. 1.  Fig. 2.
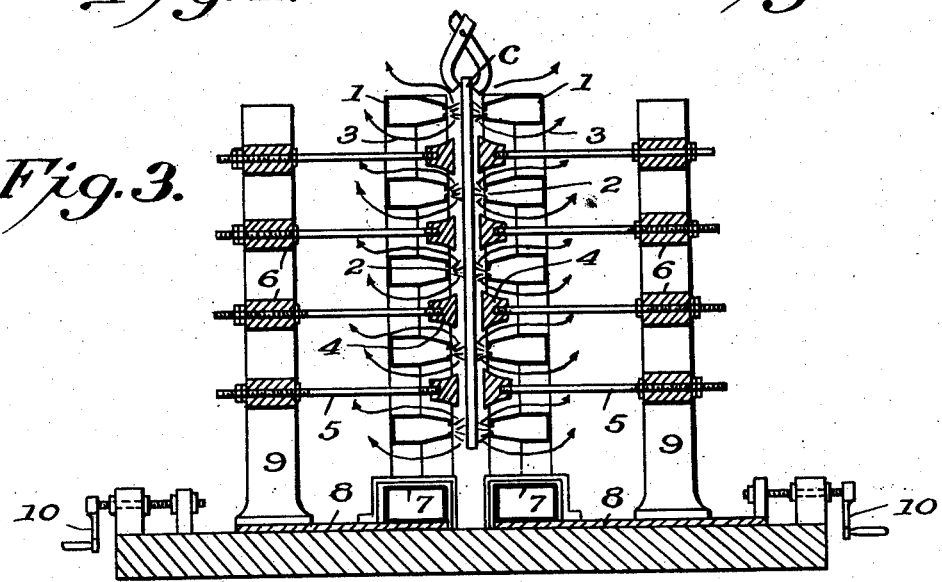
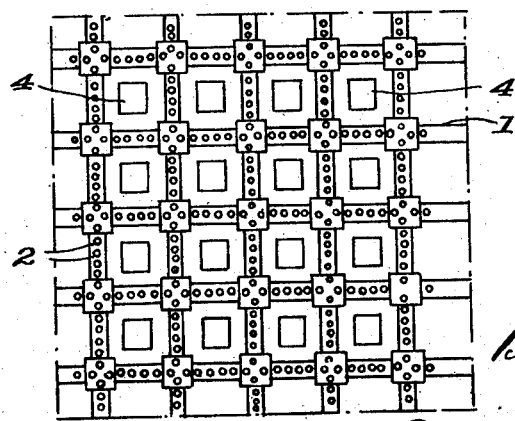
Inventor
Bernard Long Patented Oct. 13, 1942

UNITED STATES PATENT OFFICE 2,298,709

APPARATUS FOR TEMPERING GLASS

Bernard Long, Paris, France, assignor to The American Securit Company, Wilmington, Del., a company of Delaware Original application December 17, 1935, Serial No. 54,918, now Patent No. 2,244,715, dated June 10, 1941. Divided and this application March 17, 1939, Serial No. 262,578. In France December 22, 1934

2 Claims. (Cl. 49—45)

The present application is filed as a division of my prior application, Serial No. 54,918, filed December 17, 1935, Patent No. 2,244,715, issued June 10, 1941, to cover the apparatus shown therein for carrying the method there described and the product there claimed.

When tempered glass, as used for windows, particularly in wind-shields of automobiles, breaks under the influence of a shock into a large number of small harmless fragments, its transparency is altered at the time that the fragmentation is produced; when the fragments remain at their place within the wind-shield a new accommodation of the eye is necessary for the visibility again to become satisfactory. The duration of this accommodation, though very short, in the meanwhile may perhaps be sufficient, in the case of high speeds of the vehicle, to cause a disturbance in its driving, resulting in accidents.

My aforesaid prior application discloses a tempered sheet of glass or a tempered plate glass which presents, when it is broken, zones in which there are very numerous and small fragments and other zones in which the pieces have larger dimensions and polygonal or rounded forms, each of the second-mentioned zones being entirely surrounded or framed by the first-mentioned zones so that the size of the larger pieces produced in case of breakage of the sheet is at maximum of the size given to said second-mentioned zones; by virtue of the presence of the pieces of larger dimensions the visibility remains sufficient at the time of the break. By adopting sufficiently reduced dimensions for each of the said second-mentioned zones and giving to their periphery a proper shape the pieces coming from these zones in case of breakage are not dangerous while keeping sufficient visibility. The encompassing or encircling zones with fine fragmentation have for example a size of 10 to 15 mm., the encompassed zones, more or less rounded and formed by a single piece or by a small number of pieces, having a diameter of from 50 to 70 mm.

My aforesaid prior application furthermore discloses a process for the fabrication of the above described product which consists in subjecting the two types of zones to different thermal conditions in a manner to produce a stronger temper in the encompassing or surrounding zones, which assures in a case of breakage a fine fragmentation thereof, the encompassing or surrounding zones being tempered less and not breaking or if breaking, breaking up into larger pieces.

For the purpose stated, the apparatus here claimed comprises means to heat uniformly the sheet of glass over its entire surface and then to cool it more strongly in the encompassing or encircling zones.

Referring to the accompanying drawing in which corresponding parts are represented by corresponding marks of reference, Figures 1 and 2 represent, as examples, two views of the fragmentation of a glass sheet which it is the purpose of this invention to produce;

Figure 3 is a vertical section of an arrangement for cooling by blowing localized upon the encompassing zones;

Figure 4 is a front view of this arrangement.

In Figures 1 and 2, the encompassing or surrounding zones $a$ of fine fragmentation are indicated by hatching, while the encompassed or surrounded zones $b$ where the fragmentation is nil, or greatly reduced, are not hatched.

The product above described may be obtained by the mechanism shown in Figures 3 and 4 by, after a sheet "c" of glass had been uniformly heated, cooling it more strongly in the encircling zones.

For this purpose, the tempering apparatus comprises two networks of blowing tubes 1 disposed on the opposite sides of the sheet and pierced by holes 2 through which a cooling fluid 3 is projected upon the zones of fine fragmentation which are to be produced in the sheet. The blowing holes have a small diameter, for example 2 to 3 mm. and are very close to each other. The distance between the outlet of the jets and the surface of the glass must be slight, without nevertheless being such that the jets produce impressions in the glass; 2 to 3 cm. have been found sufficient in practice.

In order to shield the portions of the glass of the surrounded zones from a too sudden cooling, the screens 4 are disposed in each of the spaces between the meshes of the blowing network. The distance from these screens to the sheet of glass is adjustable, independently of the distance from the blowing holes to the sheet, by means of the rods 5 which support the screens and which slide in the guides 6. By this adjustment either all contact of blowing air with the surrounding zones may be excluded in an absolute manner or a portion thereof may be permitted to act in said zones, in the form of eddies. Thus the degree of tempering desired to be imparted to the surrounded zones can be adjusted exactly. The two networks of tubes 1 rest through the intermediary of the inlet casings 7 upon the movable plates 8 upon which are fixed likewise the frames 9 carrying the screens 4. By means of the cranks 10, the whole assembly of tubes and screens can be shifted aside simultaneously in order to introduce the sheet of glass and thereafter brought close to the glass for the exact distance which is suitable for the blowing.

The air which has struck the sheet deviates therefrom in escaping freely into the atmosphere; in order that this flow may be executed easily, which is a condition in order that the attained results are not different between the edges of the sheet and its center, a small section is imparted to the rods 5 and the frames 9 are removed sufficiently from the blowing grilles by giving, for this purpose, a sufficient length to the rods 5.

The distance from the screens 4 to the sheet also may be modified individually so that their action can be rendered different, for example between the edges and the center of this sheet.

Having thus described my invention what I claim as new and desire to secure by United States Letters Patent is:

1. In an apparatus for the manufacture of tempered glass sheets, a frame having opposed faces adapted to receive a sheet of glass therebetween, a plurality of orifices on each of said faces outlining substantially congruent mesh networks, means for conducting a cooling medium to said orifices for discharge therethrough against the opposite surfaces of the sheet to form tempered zones thereupon surrounding zones tempered to a less degree than the first mentioned zones, screens located in the openings in the mesh networks for shielding the surrounded zones against the effects of the cooling medium which is discharged through said orifices, and means for adjusting the spacing of said screens from the sheet of glass.

2. In an apparatus for the manufacture of tempered glass sheets, a frame having opposed faces adapted to receive a sheet of glass therebetween, a plurality of orifices on each of said faces outlining substantially congruent mesh networks, screens in the openings of the mesh networks for shielding the surrounded zones against the effects of the cooling medium which is discharged through said orifices and means for conducting a cooling medium to said orifices for discharge therethrough against the opposite surfaces of the sheet to form tempered zones thereupon surrounding zones tempered to a lesser degree than said first mentioned zones.

BERNARD LONG.